Jan. 2, 1951 M. T. VOIGT 2,536,860
ELECTRIC POWER TRANSMISSION FOR SEWING MACHINES
Filed May 13, 1947 3 Sheets-Sheet 1
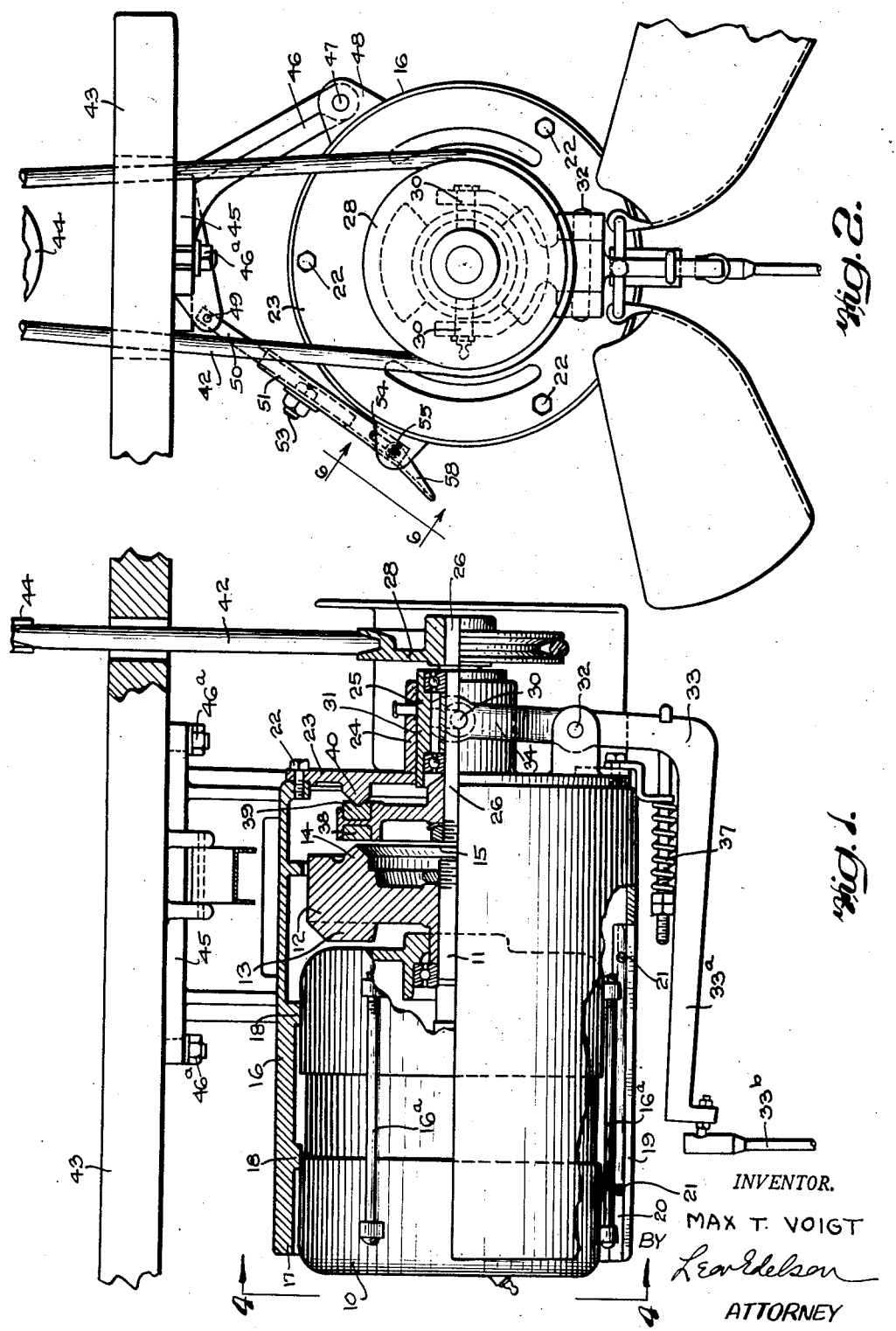
INVENTOR.
MAX T. VOIGT
BY Leo Edelson
ATTORNEY

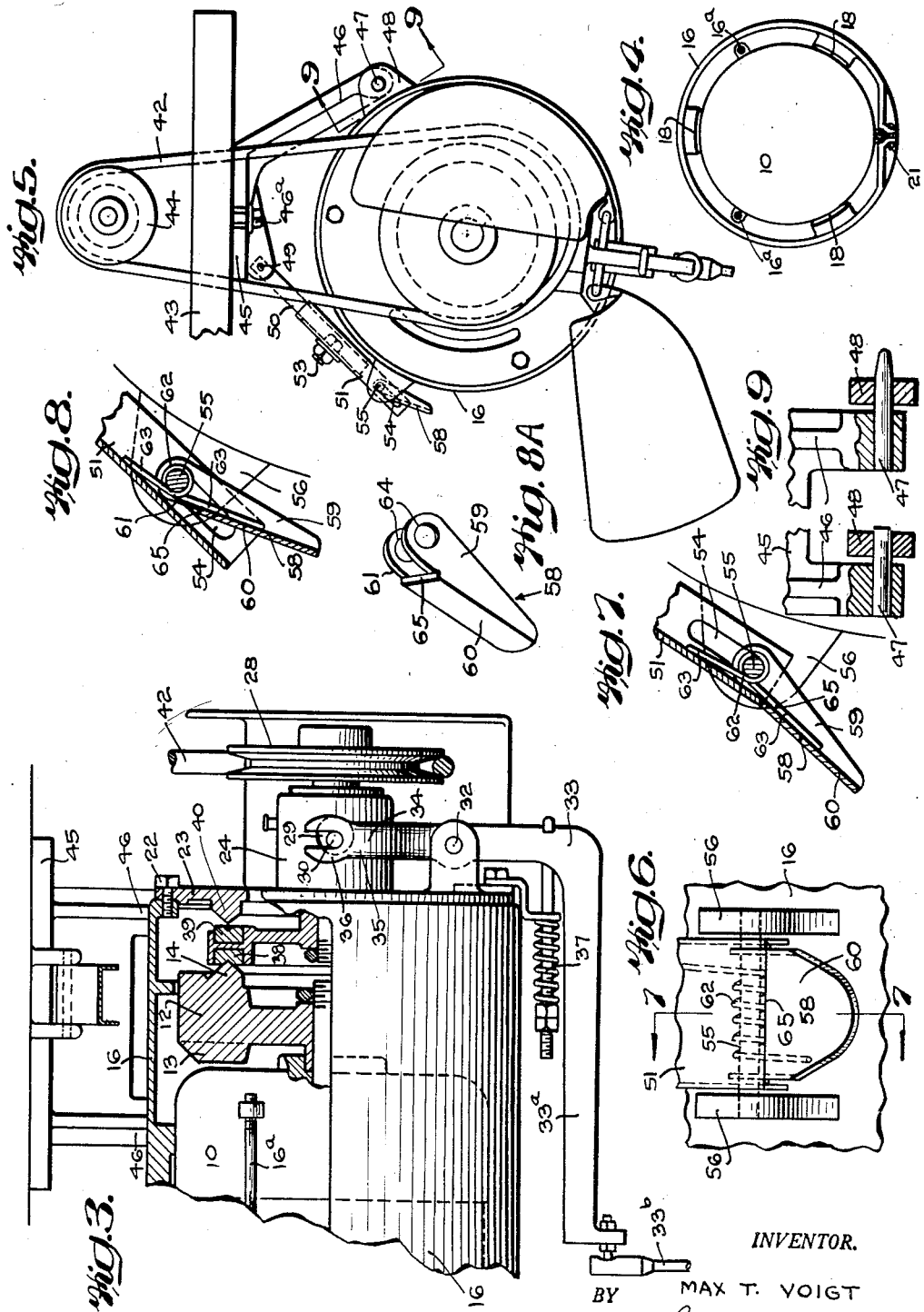

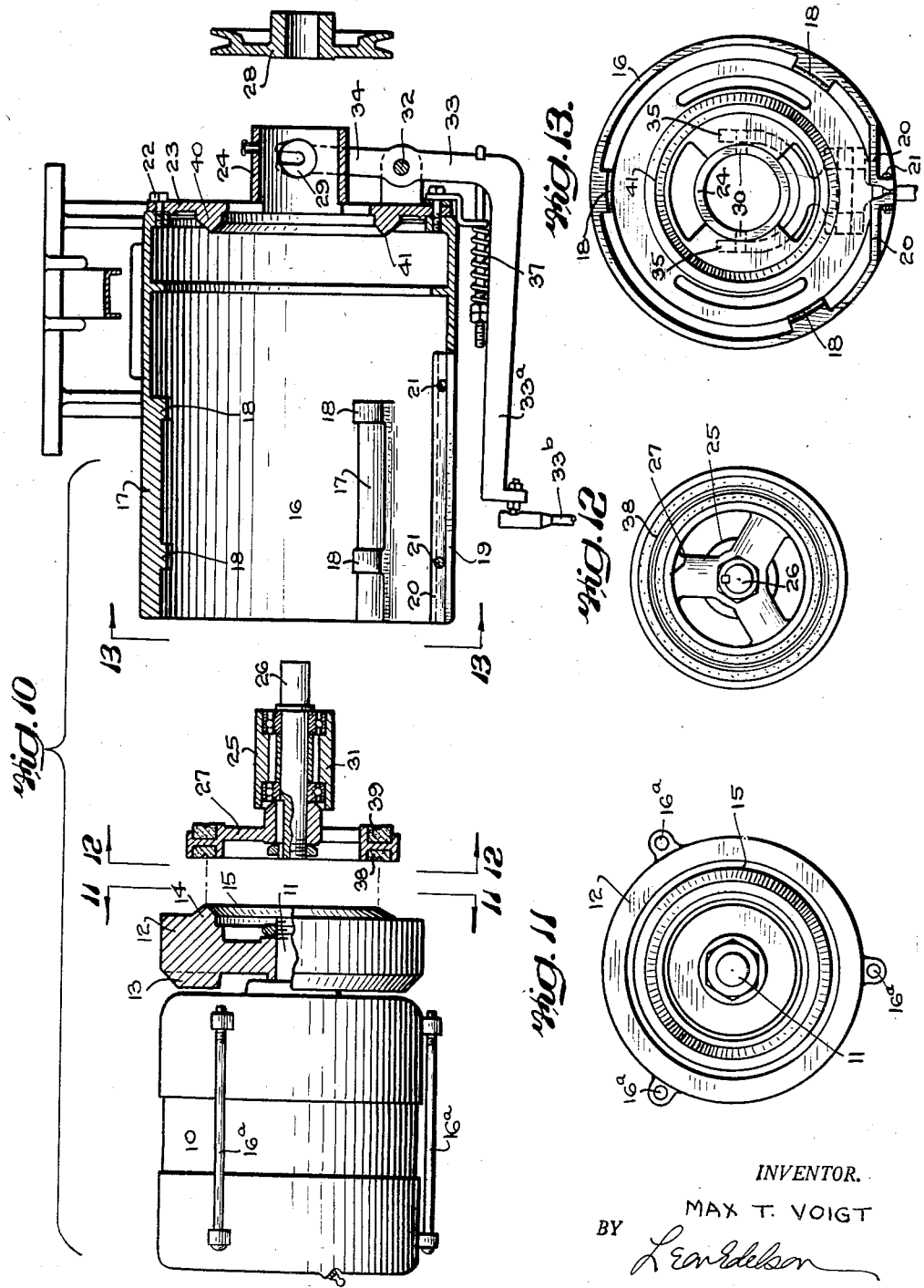

Patented Jan. 2, 1951

2,536,860

UNITED STATES PATENT OFFICE 2,536,860

ELECTRIC POWER TRANSMISSION FOR SEWING MACHINES

Max T. Voigt, Reading, Pa., assignor to American Safety Table Co., Inc., Mohnton, Pa., a corporation of Pennsylvania Application May 13, 1947, Serial No. 747,625

3 Claims. (Cl. 74—242.13)

This invention relates generally to apparatus for the transmission of power from a continuously operating motor mechanism to a machine adapted for intermittent operation, and more particularly to certain improvements in that type of apparatus disclosed in my prior Patent No. 1,560,123, granted November 3, 1925.

Among the principal objects of the present invention are to provide a simple and inexpensive continuously operating electric motor drive for an intermittently operative single unit, such as a sewing machine or the like; to provide a highly efficient clutch mechanism operative to instantly interrupt or effect operation of the motor driven single unit as conditions require, while permitting controlled operation of the unit under reduced speed without affecting any substantial change in speed of the motor; to provide an exceedingly simple and effective assembly of the motor drive and its associated clutch mechanism which permits axial adjustment of the motor relatively to the clutch mechanism to insure most efficient operation of the apparatus as a whole; to provide an improved mounting for the apparatus so as to facilitate removal and replacement of the drive belt extending between the driving and driven mechanisms without disturbing the preadjusted space relation between the belt pulleys of said mechanisms thereby insuring maintenance of correct belt tension for most efficient operation of the driven unit; and to provide generally an apparatus of the character described which is efficient and economical in operation, which is adapted for economical maintenance and repair, and which provides a high order of safety for the operator thereof.

Other objects and advantages of the present invention will appear more fully hereinafter, it being understood that the invention consists substantially in the combination, construction, location and relative arrangement of parts, all as described in detail hereinafter, as shown in the accompanying drawings and as finally pointed out in the appended claims. In the accompanying drawings, which illustrate an apparatus constructed in accordance with and embodying the general principles of the present invention:

Figure 1 is a side elevational view, partly in section, showing the apparatus as operatively mounted upon a table adapted to support a sewing machine or the like;

Figure 2 is an end elevational view of the apparatus as shown in Figure 1;

Figure 3 is a view of the apparatus showing the clutch mechanism shifted into power transmitting position;

Figure 4 is an end elevational view of the motor and its supporting casing, as viewed from the line 4—4 of Figure 1;

Figure 5 is a view similar to Figure 2 but showing the apparatus raised to permit removal of the drive belt;

Figure 6 is a view, on a somewhat enlarged scale, of the releasable detent operative to facilitate ready removal of the drive belt, as viewed from line 6—6 of Figure 2;

Figure 7 is a sectional view taken on the line 7—7 of Figure 6;

Figure 8 is a view corresponding to Figure 7 but showing the detent in belt-releasing position;

Figure 8A is a perspective view of the detent element;

Figure 9 is a detail of the pivotal support for the apparatus, as taken on the line 9—9 of Figure 5;

Figure 10 is an exploded view of the apparatus showing the several principal parts thereof; and Figures 11, 12 and 13 are elevational views of the several parts as viewed along the lines 11—11, 12—12 and 13—13, respectively, of Figure 10.

Referring now to the drawings and more particularly to Figures 1, 3 and 10 thereof, it will be observed that the apparatus of the present invention essentially includes an electric motor 10 the shaft 11 of which is extended to receive thereon a fly-wheel 12, this fly-wheel being suitably keyed or locked to the motor shaft for rotation therewith. Formed upon the face of the fly-wheel immediately adjacent the motor 10 are a plurality of circumferentially spaced radial vanes 13 which force cooling air over the peripheral surface of the motor during operation thereof. Formed upon the opposite or outer face of the fly-wheel is an annular rib 14 of generally triangular shape in transverse cross-section to provide it with a relatively sharp outer edge 15. Stay-bolts 16ª extend between and secure together the end-bells of the motor casing.

The motor 10 and its associated fly-wheel 12 are mounted as an assembly within a supporting housing 16 of generally cylindrical shape, this housing 16 being of a length somewhat greater than the overall length of the motor and fly-wheel assembly. Formed interiorly of the housing 16 as integral elements thereof are a plurality of circumferentially spaced ribs 17 each extending longitudinally of the housing and being provided with a pair of longitudinally spaced pads 18—18 adapted respectively to engage the opposite end-bells of the motor casing. Also, the housing 16 is longitudinally split, as at 19, for the major portion of its length to provide flanged parts 20—20 which are adapted to be drawn together, as by the bolts 21, to clamp the motor securely within the housing 16 with the several pairs of pads 18—18 in clamping engagement with the cylindrical surface of the motor. If desired, the flanged portions 20—20 may be disposed relatively to the cylindrical plane of the housing 16 that they also function as elements which clampingly engage the motor, the general arrangement being such that when said flanged parts 20—20 are tightly drawn together the motor is securely clamped in centered relation with respect to the housing, that is, with its shaft coaxial with the central axis of the housing. In this condition of the parts just described, the fly-wheel is also centered within the housing and is free to rotate therewithin.

Secured to the rear end of the housing 16 by means of the bolts 22 is a centrally apertured end plate 23 from which rearwardly projects a cylindrical journal box 24. Slidably fitted within this journal box 24 is a ball-bearing assembly 25 within which is rotatably journalled a shaft 26 to the oppositely projecting ends of which are respectively secured a clutch disc 27 and a belt pulley 28. The journal box or housing for the ball-bearing assembly is provided at diametrically opposite sides thereof with openings 29—29 through which respectively project a pair of studs 30—30 suitably secured to opposite sides of the external sleeve 31 of said ball-bearing assembly 25. It will be understood, of course, that the clutch disc 27 and the belt pulley 28 are each non-rotatably secured to the shaft 26 for rotation therewith and that the said clutch disc, belt pulley, shaft 26 and the ball-bearing assembly are axially shiftable as a unit within the relatively stationary journal box or housing 24 by the means presently to be described.

Pivotally secured to the end plate 23 of the motor housing 16, as at 32, is a clutch-actuating lever 33, this lever provided at its upper end with a yoke portion 34 having laterally spaced arms 35—35 adapted to embrace therebetween the journal box 24, these arms 35—35 being each provided with a slotted terminal end 36 for engagement with a stud 30 projecting outwardly through the opening 29 in the side wall of the journal box. The lever 33 is under the influence of a compression spring 37 which normally holds the lever in its position as shown in Figure 1, in which position the clutch disc 27 is disengaged from the fly-wheel of the motor 10. The lower arm 33ª of the pivoted lever is suitably connected, as by a link or rod 33ᵇ, to a foot treadle or the like (not shown) for actuation of the lever, it being noted that a downward pull upon the link 33ᵇ shifts the yoke portion 34 of the lever toward the motor and so causes the clutch disc 27 to engage the motor fly-wheel as shown in Figure 3.

As most clearly appears in Figures 1, 3 and 10, the clutch disc 27 is provided adjacent its perimetral edge with a pair of oppositely facing annular friction discs 38 and 39 of cork or other suitable resilient material, the disc 38 being adapted to engage the annular rib 14 of the motor fly-wheel 12 while the disc 39 is adapted to engage an annular rib 40 formed upon the inner face of the end plate 23 of the motor housing 16. The annular rib 40 is similar to the annular rib 14 in that it also is of generally triangular shape in transverse cross-section to provide it with a relatively sharp outer edge 41.

The cylindrical housing 16 for the motor 10 serves not only as a support for maintaining the motor and clutch mechanism in axial alinement, but also as a means for adjusting the motor axially toward or away from the clutch mechanism to insure accurate spacing between the rib 14 of the rotatable fly-wheel 12 and the rib 41 of the stationary end plate 23. To effect this adjustment it is merely necessary to loosen the clamping bolts 21 sufficiently to permit axial adjustment of the motor within the housing to present the motor fly-wheel in proper spaced relation to the end plate 23, whereupon the bolts 21 are tightened to securely maintain the motor and its associated clutch mechanism in their proper relation.

The relatively sharp edges of the annular clutch ribs 14 and 41 insure positive frictional engagement between them and their respective coacting friction discs 38 and 39, it being noted in this connection that when the friction discs 38 is shifted into engagement with the rib 14 of the rotating fly-wheel power from the motor is instantly transmitted to the pulley shaft 26 and thence to the sewing machine or other instrumentality to be operated (not shown) through the drive belt 42. Upon release of the lever 33 so as to place it under the influence of its biasing spring 37 the friction disc 39 engages the stationary rib 41 to instantly interrupt operation of the driven instrumentality while permitting the motor and its associated fly-wheel to continue rotating at full speed. By decreasing the pressure of the friction disc 38 against the rotating rib 14 to provide for controlled slip therebetween, the speed of operation of the driven instrumentality may be decreased substantially below the normal speed of operation of the motor.

The sewing machine or other instrumentality adapted to be driven by the power transmitting apparatus of the present invention is normally mounted upon a table 43, while the power transmitting apparatus is suspended therebelow, as appears most clearly in Figures 1, 2, 3 and 5, the pulley 44 of the driven instrumentality being connected to the pulley 28 of the power transmitting apparatus by the belt 42. Particularly in the case of a sewing machine, it is necessary to provide and maintain this drive belt with the proper tension and having once adjusted the belt to the proper tension, it becomes a matter of serious inconvenience if this tension be subsequently disturbed, as when it becomes necessary to replace the belt or remove it for purposes of maintenance or repair of the sewing machine or its driving mechanism.

Having in mind the foregoing, the present invention provides a special mounting for the apparatus hereinbefore described which facilitates removal of the drive belt as required without disturbing the predeterminedly fixed relation between the drive pulley 28 and the driven pulley 44. As most clearly appears in Figures 2 and 5, the motor housing 16 is pivotally secured to a bracket 45 which in turn is suitably secured, as by the bolts 46ª, to the under surface of the table 43. This bracket 45 is preferably in the form of a relatively broad plate having a pair of laterally spaced arms 46—46 (see Figure 9) respectively fitted with pins 47—47 adapted for projection through suitably apertured lugs 48—48 formed on the motor housing 16. One of these pins is preferably longer than the other, as shown in Figure 9 to serve as a guide pin for facilitating quick-detachable connection of the motor housing with its supporting bracket 45.

Pivotally secured to the bracket 45, as at 49, is a channel-shaped member 50 the free end portion of which is telescopically received within a second channel-shaped member 51. These channel-shaped members 50—51 are secured together by a bolt 53 so that they conjointly constitute a supporting link extending between the pivot 49 and the motor housing, the members being relatively adjustable to vary the overall length of the supporting link. To this end, one or the other of the members 50—51 is preferably provided with an elongated slot (not shown) through which the bolt 53 projects.

The outer free extremity of the member 51 is provided in its opposite side walls with elongated slots 54—54 through which extends a pin 55, the opposite ends of this pin being fitted in lugs 56—56 formed on the motor housing 16. Thus, the link formed of the telescoped members 50—51 serves conjointly with the bracket 45 to support the motor unit as shown most clearly in Figures 2 and 5, the weight of the unit normally maintaining the pin 55 at the outer ends of the slots 54—54 (see Figure 2). In this position of the motor unit, the drive belt 42 will be fully extended and under proper tension, the distance between centers of the pulleys 28 and 44 being fixed by adjustment of the link 50—51 to proper length. In order to remove the belt from the pulley 28, it is, of course, only necessary to raise the motor unit upwardly about the pivot pins 47—47, the opposite pin 55 being then shifted to the inner ends of the slots 54—54 of the link 50—51, thereby freeing the belt for its easy removal from the pulley 28 (see Figure 5).

During operation of the apparatus it is, of course, necessary that the motor unit be fixedly secured in position against such movement as would disturb the proper tension of the belt 42 and for that purpose there is employed a special quick-releasable locking device. This device essentially includes a channel-shaped detent member 58 the opposite side walls 59—59 of which are respectively apertured as at 64—64 and extend into the lower end of the link-member 51 for pivotal connection with the pin 55. The transversely extending web portion 60 of the detent member 58 is cut back, as at 61, to provide a shoulder 65 which is adapted to abut the free edge of the member 51, as shown in Figures 2 and 7. A coil spring 62, embracing the pin 55 with its oppositely extending ends 63—63 respectively engaging the members 51 and 58, imparts a bias to the member 58 to normally maintain it in engagement with the member 51 as shown in Figure 7, in which condition of these parts the link 50—51 is locked to the motor unit with the pin 55 disposed at the lower or outer ends of the slots 54—54. In this latter condition of the parts, the shoulder 65 of the detent 58 is in engagement with the lower free edge of the member 51.

To release the parts from their interlocked engagement and so permit the motor unit to be swung about its pivot pins 47—47 into the position shown in Figure 5, it is only necessary to press the detent member 58 inwardly toward the motor unit and so effect disengagement of the shoulder 65 of the detent with respect to the member 51 (as see Figure 8) whereupon the motor unit may be raised sufficiently to provide the belt 42 with sufficient slack to permit its removal from the pulleys 28 and/or 44, the pin 55 being then disposed at the upper or inner ends of the slots 54—54. It will be apparent by means of the locking device just described, slackening of the belt may be effected expeditiously for purposes of removing the same, all without disturbing the effective length of the link member 50—51. Thus, having once adjusted the length of the link member for correct tension of the belt 42, the latter may be repeatedly removed and replaced with assurance that the replaced belt will at all times be of the proper tension.

It will be understood, of course, that the present invention is susceptible of various changes and modifications which may be made from time to time without departing from the general principles or real spirit thereof, and it is accordingly intended to claim the same broadly, as well as specifically, as indicated in the appended claims.

What is claimed as new and useful is:

1. In a power transmitting apparatus of the character described, a motor assembly including a drive pulley associated therewith and adapted to be belt-connected to a driven pulley, a bracket for supporting said motor assembly, said bracket including a rigid member to the free end of which said assembly is pivotally connected, a link pivoted to and extending from said bracket to a point on said assembly circumferentially spaced from said pivotal connection, and spring-pressed detent means associated with said link at said spaced point and operative to releasably lock said link in position to support said motor assembly conjointly with said rigid arm.

2. In a power transmitting apparatus as defined in claim 1 wherein said link includes a pair of telescopically connected members and means for securing the same in longitudinally adjusted relation.

3. In a power transmitting apparatus as defined in claim 1 wherein the outer end of said link is pin-and-slot connected to said motor assembly and wherein said spring-pressed detent is operative to release the interlock between said link and motor assembly whereby to permit the latter to be shifted about its pivotal connection within the limits permitted by said pin-and-slot connection.

MAX T. VOIGT.

REFERENCES CITED

The following references are of record in the file of this patent:

UNITED STATES PATENTS

| Number | Name | Date |
| --- | --- | --- |
| 746,610 | Waddell et al. | Dec. 8, 1903 |
| 1,748,296 | Lombard | Feb. 25, 1930 |
| 1,799,261 | Stoody | Apr. 7, 1931 |
| 1,832,958 | Bachle | Nov. 24, 1931 |
| 2,311,993 | Olsen | Feb. 23, 1943 |